United States Patent
Kojima et al.

(10) Patent No.: US 11,515,821 B2
(45) Date of Patent: Nov. 29, 2022

(54) CONTROL DEVICE FOR ROTATING ELECTRICAL MACHINE

(71) Applicant: Mitsubishi Electric Corporation, Chiyoda-ku (JP)

(72) Inventors: Tetsuya Kojima, Tokyo (JP); Sho Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 32 days.

(21) Appl. No.: 16/478,302

(22) PCT Filed: Dec. 19, 2017

(86) PCT No.: PCT/JP2017/045564
§ 371 (c)(1),
(2) Date: Jul. 16, 2019

(87) PCT Pub. No.: WO2018/179620
PCT Pub. Date: Oct. 4, 2018

(65) Prior Publication Data
US 2020/0186070 A1 Jun. 11, 2020

(30) Foreign Application Priority Data

Mar. 27, 2017 (JP) .............................. JP2017-061584

(51) Int. Cl.
*H02P 21/00* (2016.01)
*H02P 21/18* (2016.01)
*H02P 21/22* (2016.01)

(52) U.S. Cl.
CPC .............. *H02P 21/18* (2016.02); *H02P 21/22* (2016.02); *H02P 2203/03* (2013.01)

(58) Field of Classification Search
CPC ...... H02P 21/18; H02P 21/22; H02P 2203/03; H02P 6/18
(Continued)

(56) References Cited

U.S. PATENT DOCUMENTS 5,608,300 A 3/1997 Kawabata et al.
6,801,011 B2 10/2004 Ide
(Continued)

FOREIGN PATENT DOCUMENTS

CN 103840725 B 5/2016
DE 10 2005 054 897 A1 6/2006
(Continued)

OTHER PUBLICATIONS

International Search Report dated Mar. 20, 2018, in PCT/JP2017/045564 filed on Dec. 19, 2017.
(Continued)

*Primary Examiner* — Kawing Chan
*Assistant Examiner* — Gabriel Agared
(74) *Attorney, Agent, or Firm* — Xsensus LLP

(57) ABSTRACT

A control device includes: a current detector that detects rotating electrical machine currents flowing to the rotating electrical machine; a position estimator that estimates a rotor position of the rotating electrical machine based on the rotating electrical machine currents; a controller that calculates drive voltage commands based on the rotating electrical machine currents and information on the rotor position, adds position estimation voltage commands and the drive voltage commands to obtain rotating electrical machine voltage commands. The position estimator extracts position estimation currents included in the rotating electrical machine currents, the position estimation currents being changed according to the position estimation voltage commands, and estimates the rotor position of the rotating electrical machine using a DC component of amplitudes of the position estimation currents extracted, the DC component being not changed according to the rotor position.

11 Claims, 12 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 8,245,545 | B2* | 8/2012 | Maekawa | D06F 34/10 68/12.16 |
| 8,350,507 | B2* | 1/2013 | Ito | H02P 21/24 318/400.13 |
| 8,610,388 | B2 | 12/2013 | Ito et al. | |
| 8,878,482 | B2* | 11/2014 | Kojima | H02M 7/5395 318/803 |
| 8,941,339 | B2 | 1/2015 | Zhang et al. | |
| 9,231,510 | B2* | 1/2016 | Hachiya | H02P 21/16 |
| 9,423,470 | B2* | 8/2016 | Taniguchi | G01R 33/028 |
| 2010/0194319 | A1* | 8/2010 | Ito | H02P 21/14 318/400.13 |
| 2011/0304290 | A1* | 12/2011 | Ito | H02P 6/185 318/400.32 |
| 2013/0106329 | A1* | 5/2013 | Kato | H02P 21/26 318/400.11 |
| 2014/0145654 | A1 | 5/2014 | Zhang et al. | |

FOREIGN PATENT DOCUMENTS

| | | |
|---|---|---|
| JP | 7-177788 A | 7/1995 |
| JP | 4687846 B2 | 5/2011 |
| JP | 5025142 B2 | 9/2012 |
| JP | 5069306 B2 | 11/2012 |
| JP | 5145850 B2 | 2/2013 |
| JP | 5324646 B2 | 10/2013 |

OTHER PUBLICATIONS

Indian Office Action dated Feb. 10, 2021 in Indian Application No. 201947035703.

Office Action dated Dec. 22, 2021 in German Patent Application No. 11 2017 007 328.6, 14 pages.

* cited by examiner

CONTROL DEVICE FOR ROTATING ELECTRICAL MACHINE

FIELD

The present invention relates to a control device for a rotating electrical machine, in particular a control device that controls a rotating electrical machine by obtaining rotor position information without using a position sensor that detects the rotational position of a rotor.

BACKGROUND

In order to drive a rotating electrical machine, information on the position of the rotor is required. Therefore, a conventional control device for a rotating electrical machine uses position information detected by a position sensor attached to the rotating electrical machine. For the purpose of further reducing manufacturing costs, downsizing rotating electrical machines, and improving the reliability of rotating electrical machines, techniques for driving rotating electrical machines without using position sensors have been developed. Methods for position sensorless control of a rotating electrical machine mainly include methods of estimating the position of a rotating electrical machine using an induced voltage of the rotating electrical machine and methods of estimating the position of a rotating electrical machine using saliency. In the induced-voltage-based methods, the magnitude of the induced voltage is proportional to the rotational speed. Therefore, the induced voltage decreases and the S/N ratio decreases in the zero-speed or low-speed range, which makes position estimation difficult. The saliency-based methods require that a position estimation signal for estimating the position of a rotating electrical machine be input to the rotating electrical machine, but are advantageous because the position of the rotating electrical machine can be estimated even in the zero-speed or low-speed range.

Patent Literature 1 discloses a saliency-based position sensorless control method. This position sensorless control method includes superimposing a position estimation voltage on each phase voltage that drives a rotating electrical machine and extracting a position estimation current, i.e. a high-frequency current with the same frequency as a rotating electrical machine current, to perform position estimation. Specifically, in the position sensorless control method disclosed in Patent Literature 1, the amplitude of a high-frequency current is calculated, and the rotor position is estimated based on the fact that the amplitude is a cosine function or a sine function having a frequency twice that of the electrical angle of the rotor position. This type of scheme for position estimation, which includes superposing a position estimation voltage on each phase voltage as described above, is called a "phase voltage superposition scheme". The phase voltage superposition scheme enables fast-response position estimation because a position estimate can be directly calculated from high-frequency currents. The phase voltage superposition scheme can also be used when rotating coordinate conversion, that is, d-q conversion, is not performed in drive control of a rotating electrical machine. While Patent Literature 1 uses the Fourier transform, the control device for a rotating electrical machine disclosed in Patent Literature 2 reduces the amount of calculation by integrating the sum of the squares of high-frequency currents. The control device for a rotating machine disclosed in Patent Literature 3 performs estimation by superimposing position estimation voltages in a rotating coordinate system as in Patent Literature 2. However, the control device for a rotating machine disclosed in Patent Literature 3 calculates a position estimate by causing the outer product of position estimation voltages and high-frequency currents to converge to zero. This type of scheme for position estimation, which includes superposing position estimation voltages in a rotating coordinate system as described above, is called a "rotating coordinate voltage superposition scheme".

However, the saliency-based position estimation has the following problem: the degree of magnetic saturation changes according to the magnitude of torque of a rotating electrical machine, that is, the state of load, and an increase in the degree of magnetic saturation causes a significant difference between the estimated and actual positions. In order to solve this problem, the method of estimating the magnetic pole position of a synchronous motor disclosed in Patent Literature 4 includes correcting the position estimate according to the torque of the rotating electrical machine. However, if the degree of magnetic saturation increases, the saliency of the rotating electrical machine disappears. In this case, position estimation may be impossible. In order to solve this problem, Patent Literature 3 provides a technique of superimposing a position estimation voltage on each of the d- and q-axes of a rotating coordinate system to extract a d-axis high-frequency current $i_{dh}$ and a q-axis high-frequency current $i_{qh}$ and combining the high-frequency current $i_{dh}$ and the high-frequency current $i_{qh}$ to perform position estimation based on the combined value.

CITATION LIST

Patent Literature

Patent Literature 1: Japanese Patent No. 5069306
Patent Literature 2: Japanese Patent No. 5324646
Patent Literature 3: Japanese Patent No. 5145850
Patent Literature 4: Japanese Patent No. 4687846

SUMMARY

Technical Problem

However, the magnetic pole position estimation method disclosed in Patent Literature 3 requires the process of superimposing a position estimation voltage on each of the d- and q-axes of a rotating coordinate system to extract position estimation currents, namely a d-axis high-frequency current and a q-axis high-frequency current, and the additional process of combining these position estimation currents. This causes the following problem: the calculation load needs to be increased to improve the estimation accuracy in the case of magnetic saturation. In addition, the magnetic pole position estimation methods of Patent Literature 3 and Patent Literature 4 are both based on the rotating coordinate voltage superposition scheme. Therefore, convergence calculations are required for position estimation, and the estimation response is slow. Further, these methods cannot be applied to schemes that do not use a rotating coordinate system for drive control of a rotating electrical machine.

The present invention has been made in view of the above, and an object thereof is to provide a control device for a rotating electrical machine capable of improving the accuracy of rotor position estimation while preventing an increase in calculation load even in the case of magnetic saturation.

Solution to Problem

A control device according to an aspect of the present invention for a rotating electrical machine is provided, the control device including: a current detector to detect rotating electrical machine currents flowing to the rotating electrical machine: a position estimator to estimate a rotor position of the rotating electrical machine based on the rotating electrical machine currents; a controller to calculate drive voltage commands for driving the rotating electrical machine based on the rotating electrical machine currents and information on the rotor position, to add position estimation voltage commands and the drive voltage commands to obtain rotating electrical machine voltage commands, the position estimation voltage commands being issued for phases of the rotating electrical machine for estimating the rotor position, and to output the rotating electrical machine voltage commands; and a voltage applicator to apply a voltage to the rotating electrical machine based on the rotating electrical machine voltage commands, wherein the position estimator extracts position estimation currents included in the rotating electrical machine currents, the position estimation currents being changed according to the position estimation voltage commands, and estimates the rotor position of the rotating electrical machine using a DC component of amplitudes of the position estimation currents extracted, the DC component being not changed according to the rotor position.

Advantageous Effects of Invention

The present invention can achieve the effect of improving the accuracy of rotor position estimation while preventing an increase in calculation load even in the case of magnetic saturation.

DESCRIPTION OF EMBODIMENTS

Hereinafter, control devices for rotating electrical machines according to embodiments of the present invention will be described in detail based on the drawings. The present invention is not limited to the embodiments.

First Embodiment

Figure 1:
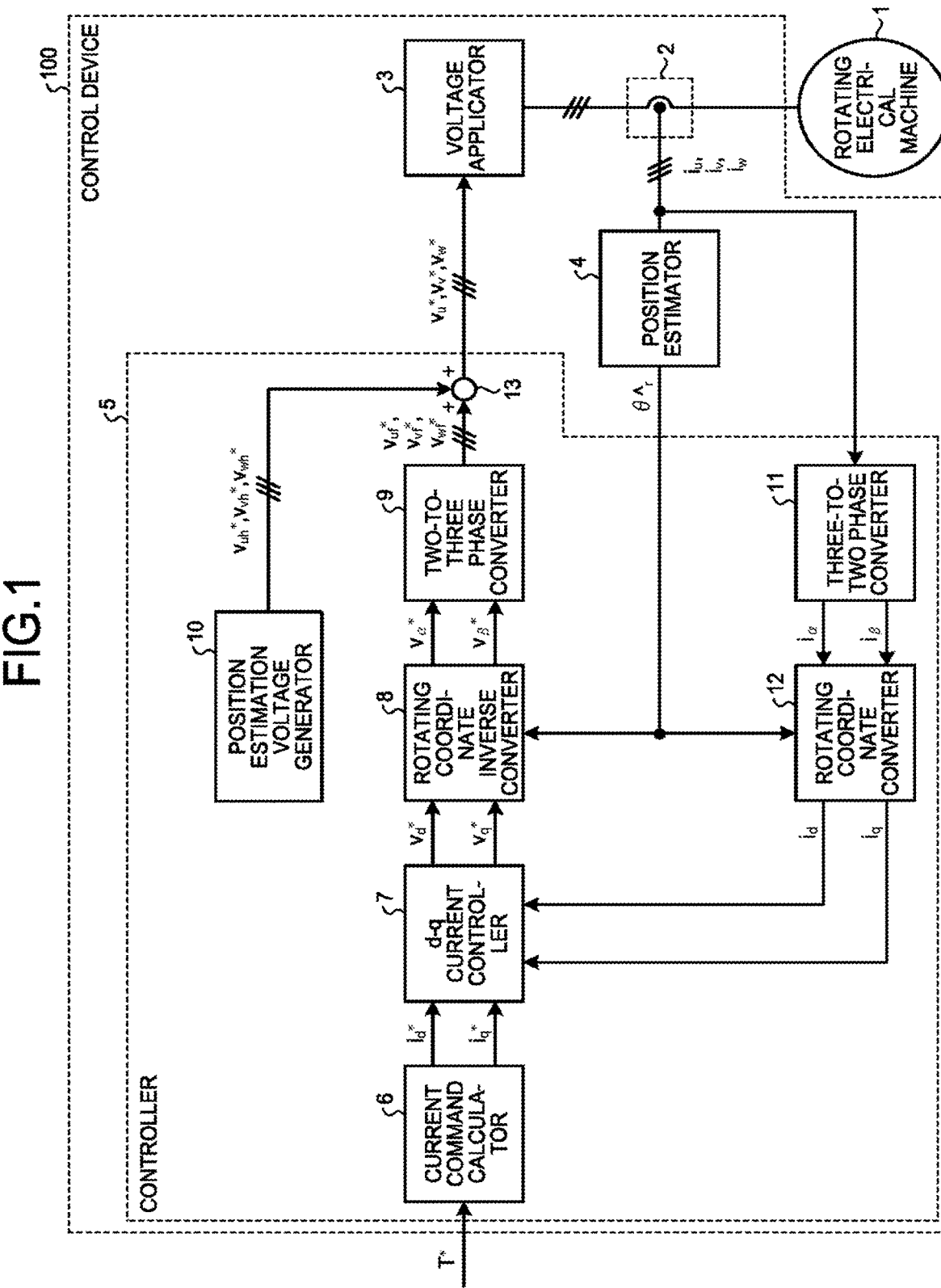
FIG. 1 is a diagram illustrating a configuration of a control device for a rotating electrical machine according to a first embodiment of the present invention.

FIG. 1 is a diagram illustrating a configuration of a control device for a rotating electrical machine according to the first embodiment of the present invention. Hereinafter, a "control device for a rotating electrical machine" may be simply referred to as a "control device". The control device 100 illustrated in FIG. 1 includes a voltage applicator 3, a current detector 2, a position estimator 4, and a controller 5. The voltage applicator 3 supplies AC power according to rotating electrical machine voltage commands $v_u^*$, $v_v^*$, and $v_w^*$. The current detector 2 detects the alternating current supplied from the voltage applicator 3 to a rotating electrical machine 1, and outputs the detected alternating current as rotating electrical machine currents $i_u$, $i_v$, and $i_w$. The position estimator 4 calculates a position estimate $\hat{\theta}_r$, using the rotating electrical machine currents $i_u$, $i_v$, and $i_w$ detected by the current detector 2. The controller 5 calculates the rotating electrical machine voltage commands $v_u^*$, $v_v^*$, and $v_w^*$ for driving the rotating electrical machine 1 such that the torque indicated by a torque command value T* is output by the rotating electrical machine 1.

The controller 5 includes a current command calculator 6, a d-q current controller 7, a rotating coordinate inverse converter 8, a two-to-three phase converter 9, a position estimation voltage generator 10, a three-to-two phase converter 11, a rotating coordinate converter 12, and an adder 13.

The rotating electrical machine 1 is a three-phase synchronous reluctance motor that generates torque using the saliency of the rotor. The voltage applicator 3 is coupled to the rotating electrical machine 1. The current detector 2 is provided between the rotating electrical machine 1 and the voltage applicator 3.

The current command calculator 6 calculates current commands $i_d^*$ and $i_q^*$ in a rotating coordinate system using the torque command value T*. The current command calculator 6 calculates the current commands $i_d^*$ and $i_q^*$ such that the current effective value with respect to the torque, that is, the copper loss, is minimized. The current command $i_d^*$ is a d-axis current command indicating a d-axis armature current component with which the magnetic resistance of the rotor of the rotating electrical machine 1 is minimized. The current command $i_q^*$ is a q-axis current command indicating a q-axis armature current component. Note that the q-axis direction is orthogonal to the d-axis direction. In addition to the torque command value T*, motor constants of the rotating electrical machine 1 are used for the calculation of the current commands $i_d^*$ and $i_q^*$. Examples of motor constants can include the mutual inductance of the rotating electrical machine 1 and the number of poles of the rotating electrical machine 1. Note that, instead of motor constants, a predetermined expression or table indicating the relationship between current commands and torque can be used.

The three-to-two phase converter 11 converts the rotating electrical machine currents $i_u$, $i_v$, and $i_w$ in a three-phase coordinate system detected by the current detector 2 into rotating electrical machine currents $i_\alpha$ and $i_\beta$ in a stationary two-phase coordinate system. Using the position estimate $\hat{\theta}_r$, the rotating coordinate converter 12 converts the rotating electrical machine currents $i_\alpha$ and $i_\beta$ in a stationary two-phase coordinate system into motor currents $i_d$ and $i_q$ in a rotating coordinate system.

The d-q current controller 7 performs current control such that the motor currents $i_d$ and $i_q$ converted by the rotating coordinate converter 12 become the current commands $i_d^*$ and $i_q^*$ calculated by the current command calculator 6, and calculates voltage commands $v_d^*$ and $v_q^*$ in a rotating coordinate system. Current control in the d-q current controller 7 can be proportional integration control, for example. The rotating coordinate inverse converter 8 uses the position estimate r to convert the voltage commands $v_d^*$ and $v_q^*$ in a rotating coordinate system which are calculated by the d-q current controller 7 into voltage commands $v_\alpha^*$ and $v_\beta^*$ in a stationary two-phase coordinate system. The two-to-three phase converter 9 converts the voltage commands $v_\alpha^*$, and $v_\beta^*$ in a stationary two-phase coordinate system into drive voltage commands $v_{uf}^*$, $v_{vf}^*$, and $v_{wf}^*$ in a three-phase coordinate system for driving the rotating electrical machine 1.

Figure 2:
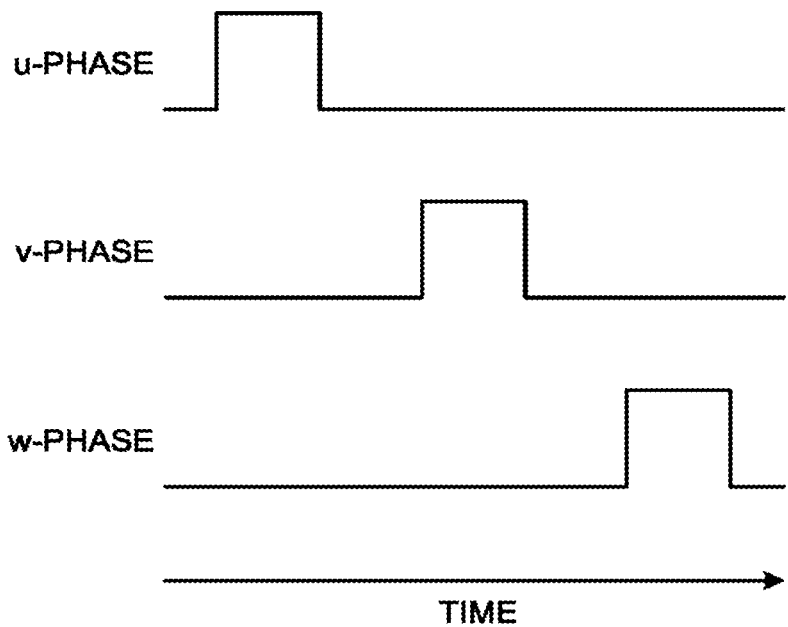
FIG. 2 is a diagram illustrating position estimation voltage commands output from a position estimation voltage generator illustrated in FIG. 1.

The position estimation voltage generator 10 calculates position estimation voltage commands $v_{uh}^*$, $v_{vh}^*$, and $v_{wh}^*$ for estimating the rotor position of the rotating electrical machine 1. FIG. 2 is a diagram illustrating position estimation voltage commands output from the position estimation voltage generator illustrated in FIG. 1. In the first embodiment, the position estimation voltage commands $v_{uh}^*$, $v_{vh}^*$, and $v_{wh}^*$ are pulse-like voltages as illustrated in FIG. 2, and are separately applied to the phases, correspondingly. In the illustrated case, each of the pulse-like voltages is sequentially applied to the u-, v-, and w-phases in this order.

The adder 13 adds the position estimation voltage commands $v_{uh}^*$, $v_{vh}^*$, and $v_{wh}^*$ and the drive voltage commands $v_{uf}^*$, $v_{vf}^*$, and $v_{wf}^*$ to obtain the rotating electrical machine voltage commands $v_u^*$, $v_v^*$, and $v_w^*$, and outputs the rotating electrical machine voltage commands $v_u^*$, $v_v^*$, and $v_w^*$ to the voltage applicator 3.

Figure 3:
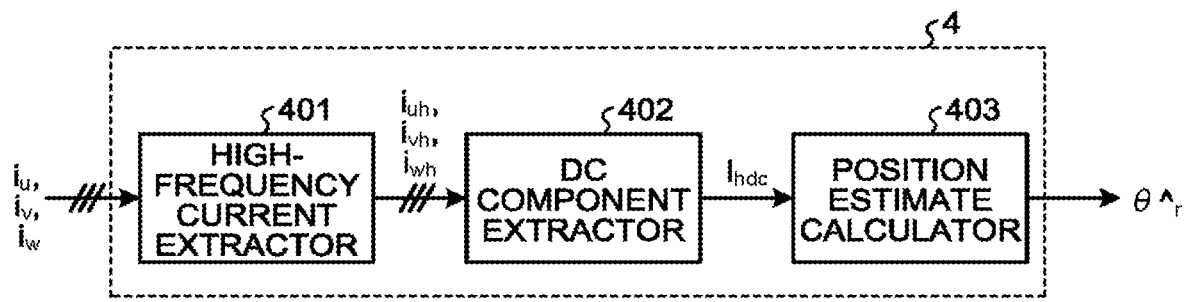
FIG. 3 is a diagram illustrating a configuration of a position estimator according to the first embodiment of the present invention.

FIG. 3 is a diagram illustrating a configuration of the position estimator according to the first embodiment of the present invention. The position estimator 4 includes a high-frequency current extractor 401, a DC component extractor 402, and a position estimate calculator 403. The high-frequency current extractor 401 calculates amplitudes $i_{uh}$, $i_{vh}$, and $i_{wh}$ of high-frequency currents that are position estimation currents. The DC component extractor 402 calculates the average of the amplitudes $i_{uh}$, $i_{vh}$, and $i_{wh}$ of the high-frequency currents, and extracts the calculated average as a DC component $I_{hdc}$ of the high-frequency current amplitudes. The position estimate calculator 403 calculates the position estimate $\hat{\theta}_r$ from the DC component $I_{hdc}$ of the high-frequency current amplitudes using the relationship between the rotor position and the DC component of high-frequency current amplitudes around the d-axis of the rotating electrical machine 1. Hereinafter, the DC component $I_{hdc}$ of the high-frequency current amplitudes may be referred to as the "position calculation signal A".

From the rotating electrical machine currents, the high-frequency current extractor 401 extracts the components changed according to the position estimation voltage commands, that is, extracts high-frequency currents $i_{uh}'$, $i_{vh}'$, and $i_{wh}'$ that are position estimation currents. The high-frequency current extractor 401 further calculates the amplitudes $i_{uh}$, $i_{vh}$, and $i_{wh}$ of the high-frequency currents. The high-frequency current extractor 401 according to the first embodiment subtracts the current values obtained after the application of the pulse-like voltages from the current values obtained before the application of the pulse-like voltages, thereby extracting the high-frequency currents $i_{uh}'$, $i_{vh}'$, and $i_{wh}'$ as expressed by Formula (1) below. Note that the method of extracting high-frequency currents is not limited to this, and a low-pass filter or a high-pass filter may be used to extract high-frequency currents.

[Formula 1]

$$i_{uh}' = I_{hdc} - I_{hac} \cos(2\theta_r)$$

$$i_{vh}' = I_{hdc} - I_{hac} \cos(2\theta_r + {}^2\!/_3\pi)$$

$$i_{wh}' = I_{hdc} - I_{hac} \cos(2\theta_r - {}^2\!/_3\pi) \quad (1)$$

In a case where the position estimation voltage commands are pulse-like voltages, the amplitudes $i_{uh}$, $i_{vh}$, and $i_{wh}$ of the high-frequency currents are approximately equal to the high-frequency currents $i_{uh}'$, $i_{vh}'$, and $i_{wh}'$ as expressed by Formula (2) below.

[Formula 2]

$$i_{uh} \approx i_{uh}'$$

$$i_{vh} \approx i_{vh}'$$

$$i_{wh} \approx i_{wh}' \quad (2)$$

Note that amplitudes of the extracted high-frequency currents may be attenuated or amplified due to the above-mentioned current value subtraction process, low-pass filter, or high-pass filter. In this case, however, all the phases have the same magnification of attenuation or amplification, so the attenuation or amplification does not affect the subsequent position estimation.

Suppose, among the amplitudes of the high-frequency currents, the component that does not change according to the rotor position is the "DC component of the high-frequency current amplitudes" or "$I_{hdc}$", the amplitude of the component that changes according to the rotor position is the "amplitude of the AC component of the high-frequency current amplitudes" or "$I_{hac}$", and the rotor position is "$\theta_r$". In this case, the amplitudes of the extracted high-frequency currents include components that are a cosine function of the double angle of the rotor position as described in paragraph [0037] of the specification of Patent Literature 2. In Patent Literature 2, the rotor position is assumed to be zero when the d-axis of the rotating electrical machine is aligned with the u-phase. In this case, the u-phase has the largest inductance, and the u-phase has the smallest high-frequency current amplitude. The DC component extractor 402 extracts the position calculation signal A, namely the DC component $I_{hdc}$ of the high-frequency current amplitudes, by calculating the average of the amplitudes $i_{uh}$, $i_{vh}$, and $i_{wh}$ of the high-frequency currents as expressed by Formula (3) below.

[Formula 3]

$$I_{hdc} = \frac{i_{uh} + i_{vh} + i_{wh}}{3} \quad (3)$$

As described in paragraphs [0059] to [0070] of the specification of Patent Literature 2, the rotor position is estimated using the AC components of the high-frequency current amplitudes in Patent Literature 2. Hereinafter, the AC components of the high-frequency current amplitudes may be referred to as the "position calculation signal B". As expressed by Formula (4) below, the AC components $i_{uhac}$, $i_{vhac}$, and $i_{whac}$ of the high-frequency current amplitudes are obtained by subtracting the DC component of the high-frequency current amplitudes from the amplitudes of the high-frequency currents expressed by Formulas (1) and (2) above.

[Formula 4]

$$i_{uhac} = -I_{hac} \cos(2\theta_r)$$

$$i_{vhac} = -I_{hac} \cos(2\theta_r + \tfrac{2}{3}\pi)$$

$$i_{whac} = -I_{hac} \cos(2\theta_r - \tfrac{2}{3}\pi) \quad (4)$$

For position estimation, six sections are provided at intervals of 60° (electrical angle) around the zero-cross point of each of the three-phase position calculation signals. In each section, the part of the position calculation signal B having a zero-cross point is expressed as a function of $\sin(2\theta_r)$ or a function of $\sin(2\theta_r)$ with respect to the rotor position $\theta_r$. Therefore, a position estimate is calculated from the position calculation signal B by linear approximation of these functions. A position estimate can be obtained by performing an inverse cosine calculation on any one signal of the AC components of the high-frequency current amplitudes of Formula (4) above. A position estimate can also be obtained by performing a three-to-two phase conversion on the three-phase-coordinate position calculation signal B and performing an inverse tangent calculation.

Figure 4:
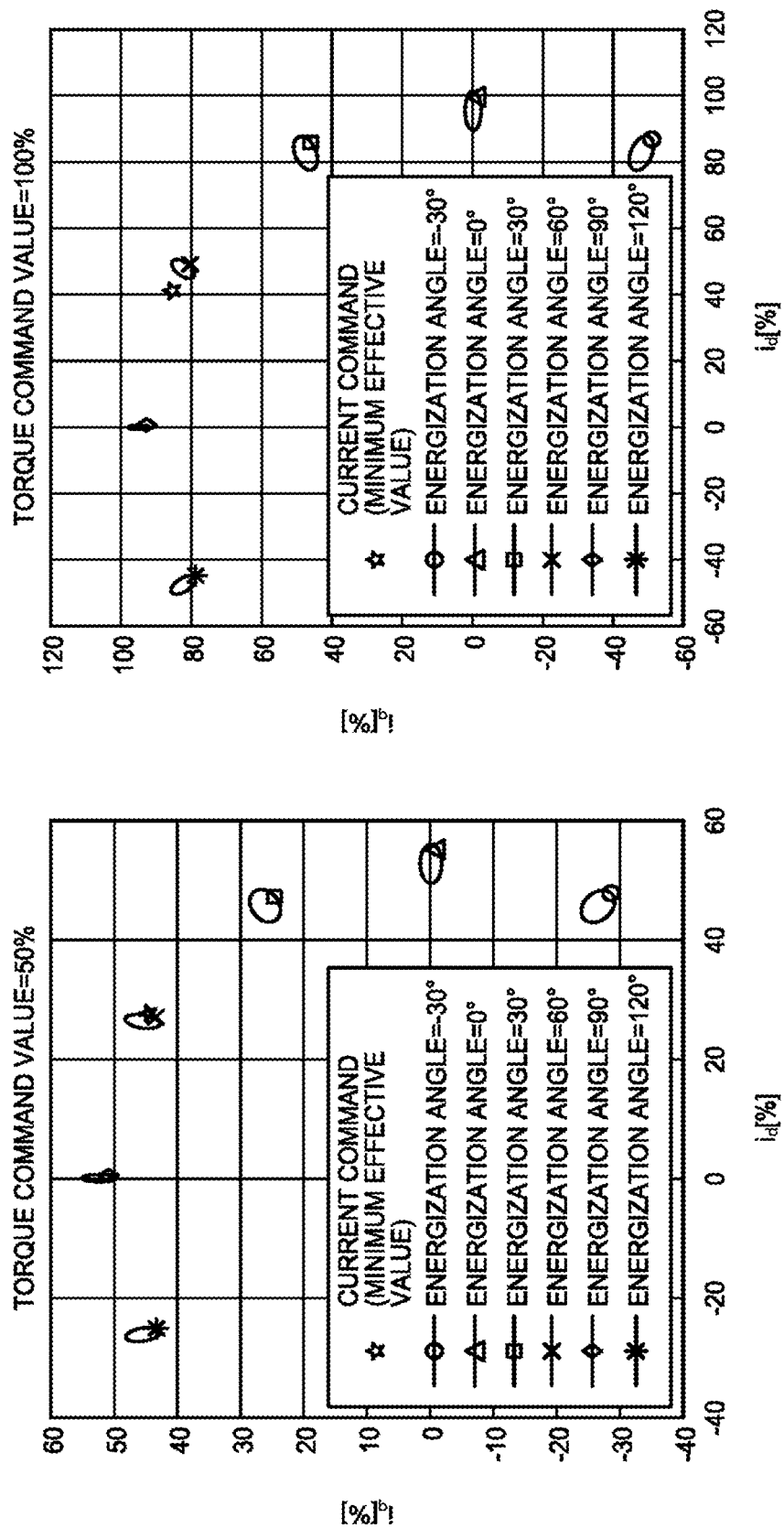
FIG. 4 is a diagram illustrating the locus of high-frequency currents indicating the saliency of a rotating electrical machine and the change of the locus of the high-frequency currents applied at specific energization angles.

However, in the case of saliency-based position estimation, the degree of magnetic saturation changes according to the magnitude of torque of the rotating electrical machine 1, causing a significant difference between the estimated and actual positions. For the purpose of checking the saliency of the rotating electrical machine 1 and the change thereof, the locus of the high-frequency currents applied at various energization angles is shown in FIG. 4 by the current amplitudes obtained when the torque command values T* of 50% and 100% of the rated value are input. FIG. 4 is a diagram illustrating the locus of high-frequency currents indicating the saliency of a rotating electrical machine and the change of the locus of the high-frequency currents applied at specific energization angles. The left side of FIG. 4 illustrates the locus of the high-frequency currents that flow when the torque command value T* of 50% of the rated value is input. The right side of FIG. 4 illustrates the locus of the high-frequency currents that flow when the torque command value T* of 100% of the rated value is input. The horizontal axis represents the d-axis component $i_d$ of the high-frequency currents, and the vertical axis represents the q-axis component $i_q$ of the high-frequency currents. Regarding the current values in the vertical and horizontal axes, 100% indicates the value that gives a torque of 100% of the rated value in the minimum ratio of torque to current. FIG. 4 illustrates the d- and q-axis components $i_d$ and $i_q$ of the high-frequency currents applied at six different energization angles.

In the rotating electrical machine 1 that receives such torque command values T*, the amplitudes of the high-frequency currents caused by the saliency of the rotor are basically large in the q-axis direction and small in the d-axis direction. In other words, the locus of the high-frequency currents is an ellipse whose minor axis is the d-axis. With a conventional technique for position estimation, the minor axis direction of the ellipse is estimated to be the d-axis. Here, in a case where the torque is large or the energization angle of the rotating electrical machine currents is close to the d-axis direction, the degree of magnetic saturation increases, and the d-axis component of the high-frequency current amplitudes becomes equal to the q-axis component thereof. That is, the locus of the high-frequency currents comes to resemble a true circle rather than an ellipse, which makes saliency-based position estimation impossible. In a case where the torque is even larger than the above case, the degree of magnetic saturation increases. When the energization angle is close to the d-axis, the ellipse is inclined in the d-axis direction, and when the energization angle is close to the q-axis, the ellipse is inclined in the q-axis direction. Here, the energization angle is calculated using a position estimate. The position estimate includes an error due to the voltage output error of the voltage applicator 3 and the current detection error of the current detector 2. That is, in a case where the position estimate includes an error in the d-axis direction, the energization angle with respect to the true rotor position comes closer to the d-axis direction. The resultant position estimate is therefore even larger in the d-axis direction than the previous position estimate. A similar increase in position estimate error is also observed in the q-axis direction. The increase of the estimation error makes it impossible to stably estimate the rotor position to drive the rotating electrical machine 1.

Figure 5:
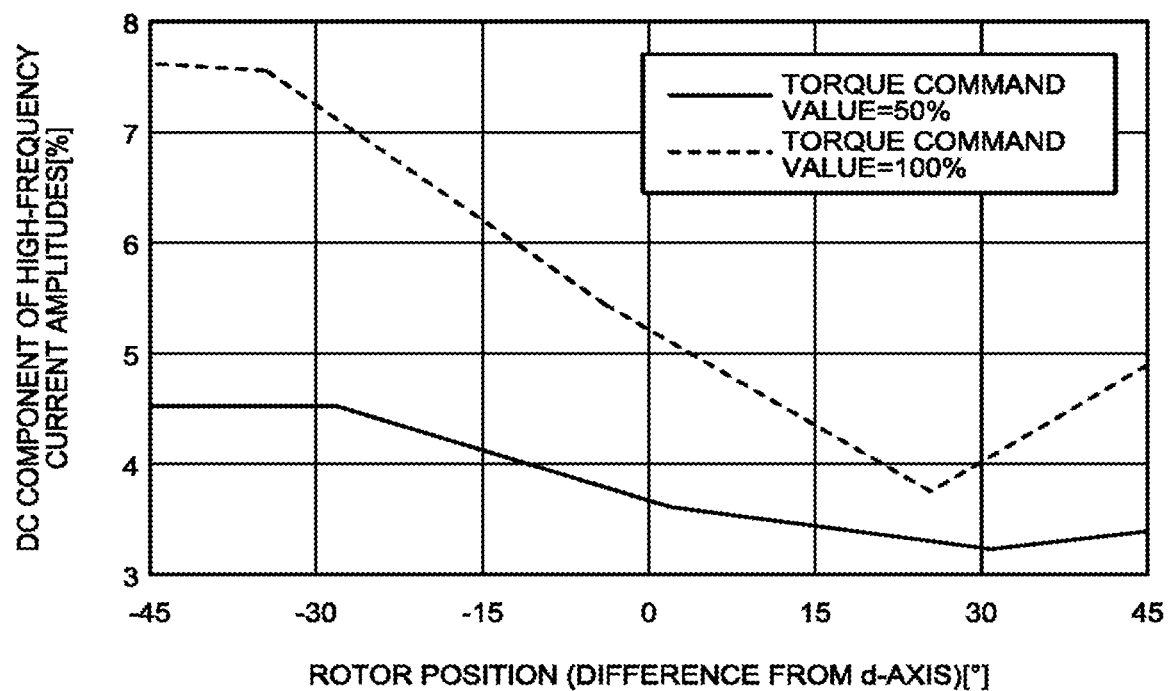
FIG. 5 is a diagram illustrating the relationship between the rotor position of a rotating electrical machine and the DC component of high-frequency current amplitudes.

In the first embodiment, the position estimate calculator 403 performs position estimation so that position estimation can be performed even when the degree of magnetic saturation is large. The relationship between the rotor position and the DC component $I_{hde}$ of the high-frequency current amplitudes that changes according to the rotor position can be summarized as illustrated in FIG. 5. FIG. 5 is a diagram illustrating the relationship between the rotor position of a rotating electrical machine and the DC component of high-frequency current amplitudes. The vertical axis represents the DC component of high-frequency current amplitudes, and the horizontal axis represents the rotor position. The rotor position is represented by the difference from the reference position, i.e. the d-axis of the rotating electrical machine 1. The solid line in FIG. 5 is the locus of the DC component of the high-frequency current amplitudes that flow when the torque command value T* of 50% of the rated value is input. The dotted line in FIG. 5 is the locus of the DC component of the amplitudes of the high-frequency currents that flow when the torque command value T* of 100% of the rated value is input. It can be seen from FIG. 5 that there is a one-to-one relationship between the rotor position and the DC component of high-frequency current amplitudes around the d-axis of the rotating electrical machine 1. Thus, the rotor position can be uniquely determined from the DC component of high-frequency current amplitudes around the d-axis (−30° to +25°) illustrated in FIG. 5. The position estimate calculator 403 stores this relationship in advance, and calculates the position estimate $\hat{\theta}_r$ using this relationship and the DC component $I_{hde}$ of the high-frequency current amplitudes. Note that this relationship is stored in association with the range of torques or rotating electrical machine currents expected to be used.

In the first embodiment, by using the DC component of the amplitudes of position estimation currents in the saliency-based position sensorless control method, even when the degree of magnetic saturation of the rotating electrical machine 1 is large, it is possible to stably estimate the rotor position to drive the rotating electrical machine 1 without increasing the calculation load to improve the position estimation accuracy.

Second Embodiment

In the first embodiment, drive control of the rotating electrical machine 1 is performed in a rotating coordinate system. Control in a rotating coordinate system is widely used and enables high-response drive control of the rotating electrical machine 1. However, control in a rotating coordinate system requires rotating coordinate conversion and control calculations therefor. In the second embodiment, an exemplary configuration for performing drive control of the rotating electrical machine 1 in a three-phase coordinate system will be described.

Figure 6:
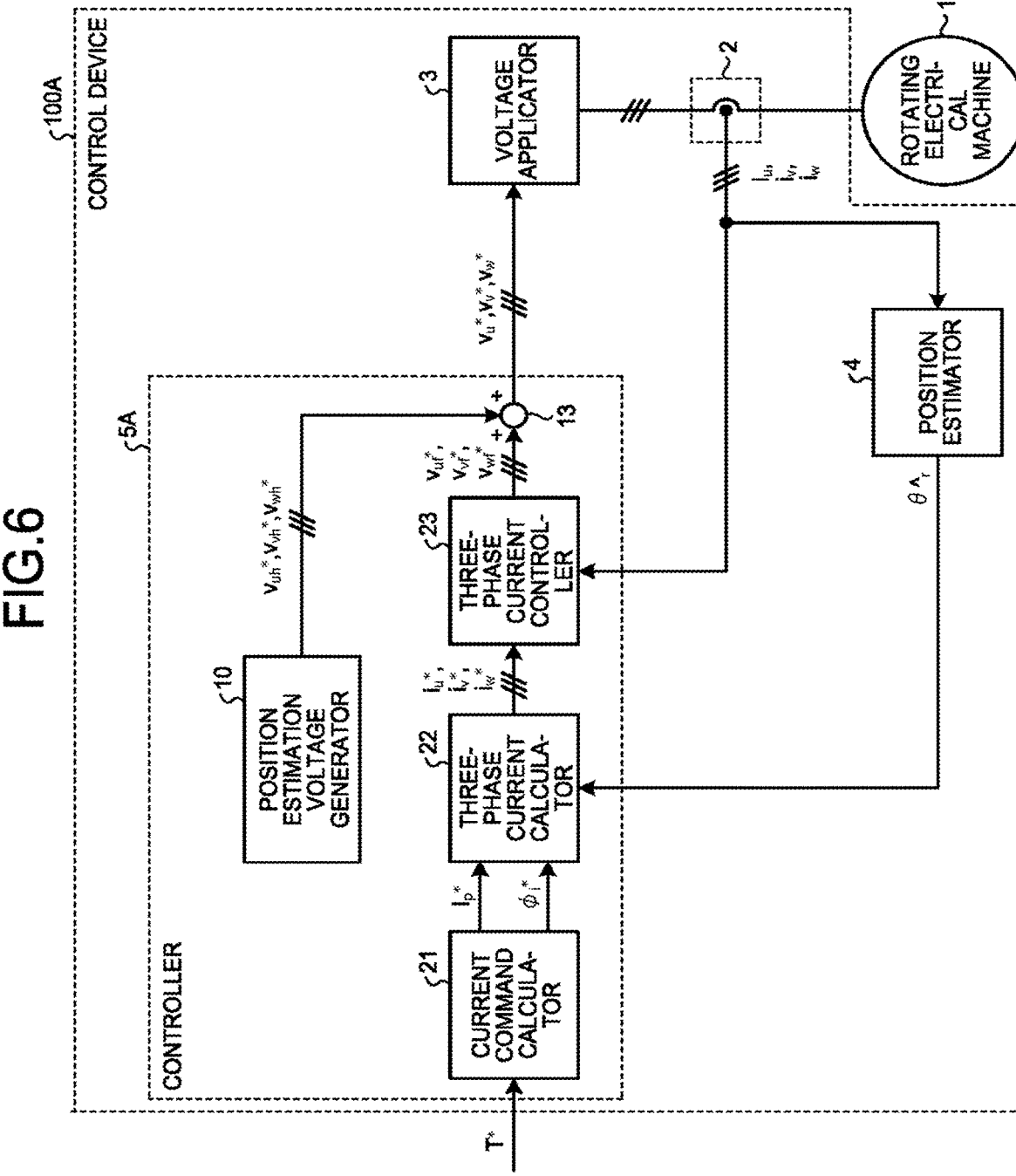
FIG. 6 is a diagram illustrating a configuration of a control device for a rotating electrical machine according to a second embodiment of the present invention.

FIG. 6 is a diagram illustrating a configuration of a control device for a rotating electrical machine according to the second embodiment of the present invention. The difference between the control device 100 according to the first embodiment and the control device 100A according to the second embodiment is that the control device 100A uses a controller 5A instead of the controller 5.

The controller 5A includes the position estimation voltage generator 10, a current command calculator 21, a three-phase current calculator 22, and a three-phase current controller 23. The current command calculator 21 calculates a current amplitude command $I_p^*$ and an energization angle command $\varphi_i'$ using the torque command value $T^*$. The current command calculator 21 calculates the current amplitude command $I_p^*$ and the energization angle command $\varphi_i^*$ such that the current effective value with respect to the torque, that is, the copper loss, is minimized. The three-phase current calculator 22 calculates three-phase current commands $i_u^*$, $i_v^*$, and $i_w^*$ using the position estimate $\hat{\theta}_r$, the current amplitude command $I_p^*$, and the energization angle command $\varphi_i^*$ as expressed by Formula (5) below.

[Formula 5]

$i_u^* = I_p^* \cos(\hat{\theta}_r + \varphi_i^*)$ $i_v^* = I_p^* \cos(\hat{\theta}_r + \varphi_i^* - \tfrac{2}{3}\pi)$ $i_w^* = I_p^* \cos(\hat{\theta}_r + \varphi_i^* + \tfrac{2}{3}\pi)$ (5)

The three-phase current controller 23 performs current control such that the rotating electrical machine currents $i_u$, $i_v$, and $i_w$ in a three-phase coordinate system detected by the current detector 2 become the three-phase current commands $i_u^*$, $i_v^*$, and $i_w^*$, and calculates the drive voltage commands $v_{uf}^*$, $v_{vf}^*$, and $v_{wf}^*$ in a three-phase coordinate system. Current control in the three-phase current controller 23 can be proportional integration control, for example. The adder 13 adds the position estimation voltage commands $v_{uh}^*$, $v_{vh}^*$, and $v_{wh}^*$ calculated by the position estimation voltage generator 10 and the drive voltage commands $v_{uf}^*$, $v_{vf}^*$, and $v_{wf}^*$ calculated by the three-phase current controller 23 to obtain the rotating electrical machine voltage commands $v_u^*$, $v_v^*$, and $v_w^*$, and outputs the rotating electrical machine voltage commands $v_u^*$, $v_v^*$, and $v_w^*$ to the voltage applicator 3.

As described above, even when drive control of the rotating electrical machine 1 is not performed in a rotating coordinate system, the control device 100A according to the second embodiment can accurately execute position estimation during magnetic saturation while preventing an increase in calculation load.

Third Embodiment

In the first and second embodiments, the pulse-like position estimation voltage commands $V_{uh}^*$, $v_{vh}^*$, and $v_{wh}^*$ are used. In the third embodiment, multiphase AC voltages are used as the position estimation voltage commands $v_{uh}^*$, $v_{vh}^*$, and $V_{wh}^*$.

Figure 7:
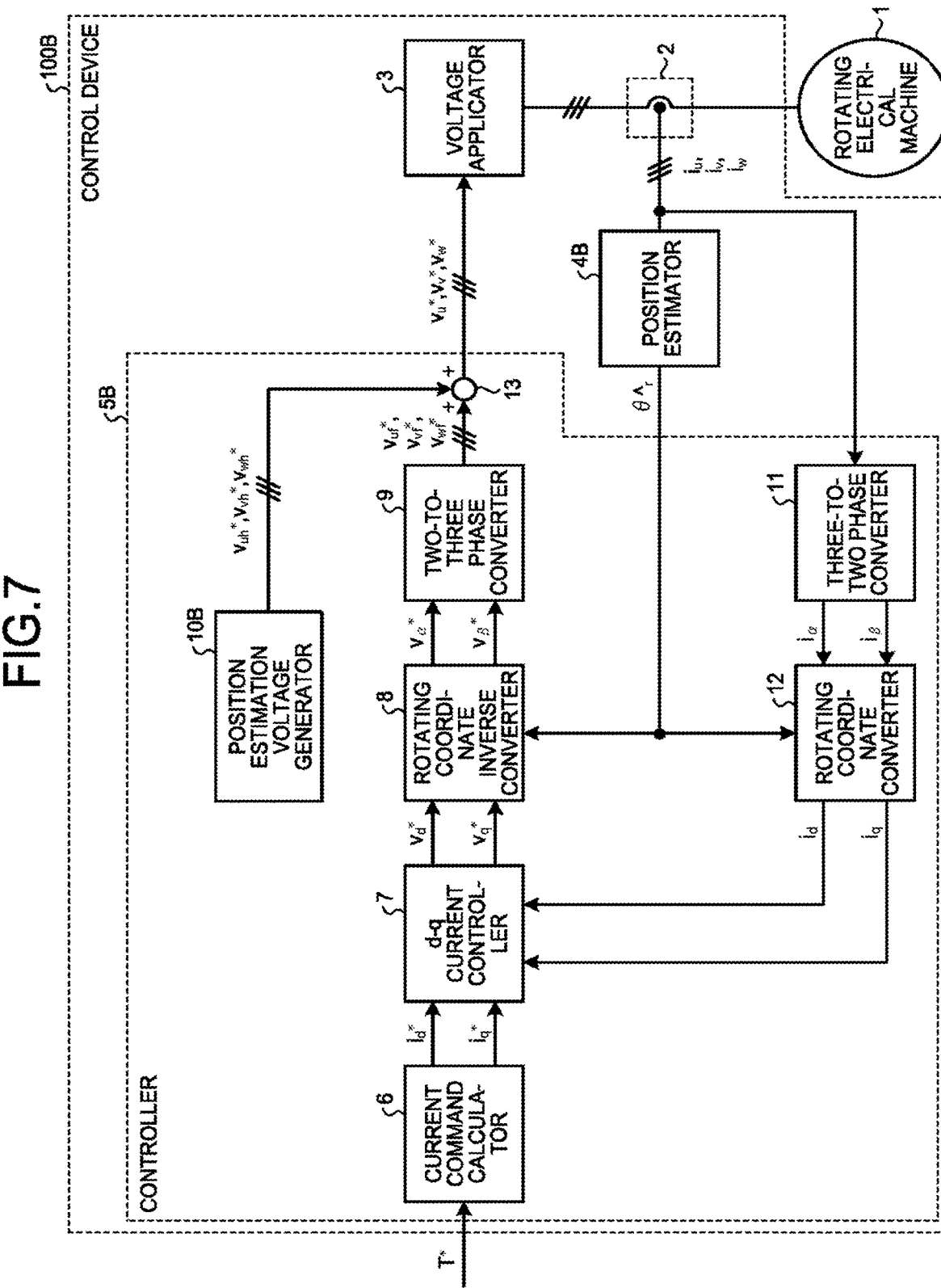
FIG. 7 is a diagram illustrating a configuration of a control device for a rotating electrical machine according to a third embodiment of the present invention.

FIG. 7 is a diagram illustrating a configuration of a control device for a rotating electrical machine according to the third embodiment of the present invention. The difference between the control device 100 according to the first embodiment and the control device 100B according to the third embodiment is that the control device 100B uses a controller 5B instead of the controller 5 and a position estimator 4B instead of the position estimator 4.

The controller 5B includes the current command calculator 6, the d-q current controller 7, the rotating coordinate inverse converter 8, the two-to-three phase converter 9, a position estimation voltage generator 10B, the three-to-two phase converter 11, the rotating coordinate converter 12, and the adder 13. The controller 5B uses the position estimation voltage generator 10B instead of the position estimation voltage generator 10.

The position estimation voltage generator 10B generates the position estimation voltage commands $v_{uh}^*$, $V_{vh}^*$, and $v_{wh}^*$ which are multiphase AC voltages having an amplitude vh and an angular frequency $\omega_h t$ as expressed by Formula (6) below.

[Formula 6]

$v_{uh}^* = V_{hp} \sin \omega_h t$ $v_{vh}^* = V_{hp} \sin(\omega_h t - \tfrac{2}{3}\pi)$ $v_{wh}^* = V_{hp} \sin(\omega_h t + \tfrac{2}{3}\pi)$ (6)

Figure 8:
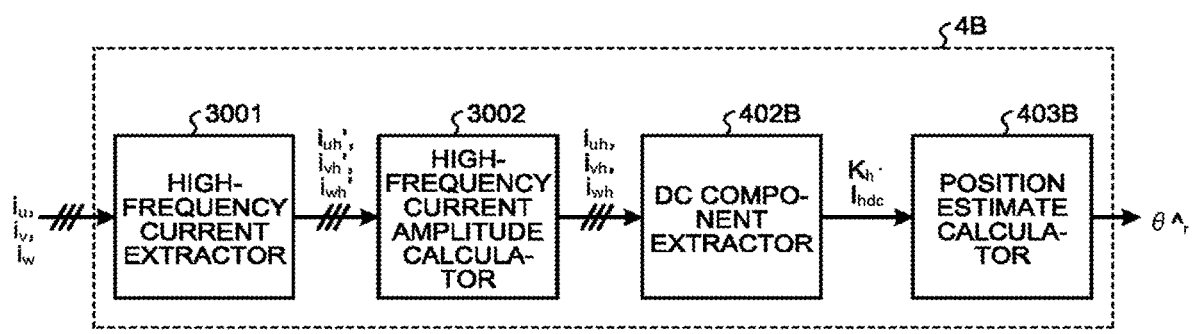
FIG. 8 is a diagram illustrating a configuration of a position estimator according to the third embodiment of the present invention.

FIG. 8 is a diagram illustrating a configuration of the position estimator according to the third embodiment of the present invention. The difference between the position estimator 4 according to the first embodiment and the position estimator 4B according to the third embodiment is that the position estimator 4B uses a high-frequency current extractor 3001 and a high-frequency current amplitude calculator 3002 instead of the high-frequency current extractor 401, a DC component extractor 402B instead of the DC component extractor 402, and a position estimate calculator 403B instead of the position estimate calculator 403.

Using a notch filter, the high-frequency current extractor 3001 extracts high-frequency currents $i_{uh}$, $i_vh$, and $i_{wh}$ which are position estimation currents as expressed by Formula (7) below. The method of extracting the high-frequency currents $i_{uh}'$, $i_{vh}'$, and $i_{wh}'$ is not limited to this, and a low-pass filter or a high-pass filter may be used to extract high-frequency currents. The extracted high-frequency currents $i_{uh}'$, $i_{vh}'$, and $i_{wh}'$ include components that change according to a cosine function of the double angle of the rotor position as described in paragraph [0037] of the specification of Patent Literature 2 or as expressed by Formula (1) above.

[Formula 7]

$$i_{uh}' = \{I_{hdc} - I_{hac}\cos(2\theta_r)\}\frac{v_{uh}^*}{V_{hp}}$$

$$i_{vh}' = \left\{I_{hdc} - I_{hac}\cos\left(2\theta_r + \frac{2}{3}\pi\right)\right\}\frac{v_{vh}^*}{V_{hp}} \quad (7)$$

$$i_{wh}' = \left\{I_{hdc} - I_{hac}\cos\left(2\theta_r - \frac{2}{3}\pi\right)\right\}\frac{v_{wh}^*}{V_{hp}}$$

As expressed by Formula (7) above, the amplitudes of the high-frequency currents $i_{uh}'$, $i_{vh}'$, and $i_{wh}'$ include information on the rotor position. The high-frequency current amplitude calculator 3002 obtains the amplitudes $i_{uh}$, $i_{vh}$, and $i_{wh}$ of the high-frequency currents by integrating the squares of the high-frequency currents $i_{uh}'$, $i_{vh}'$, and $i_{wh}'$ extracted by the high-frequency current extractor 3001, as described in paragraphs [0049] to [0051] of the specification of Patent Literature 2 or as expressed by Formula (8) below. The coefficient $K_h$ in Formula (8) below is a magnification dependent on the integration interval. Therefore, the actual amplitudes of the high-frequency currents are obtained by multiplying the true amplitudes by this magnification. However, because all the phases have the same magnification, the subsequent position estimation is not affected. When an integral multiple of the half period of the position estimation voltages is selected as the integration interval, it is possible to always smooth the pulsating component of the squares of the high-frequency currents to obtain the amplitudes of the high-frequency currents. Instead of integration, a low-pass filter can be used.

[Formula 8]

$$i_{uh} = K_h\{I_{hdc} - I_{hac}\cos(2\theta_r)\}$$

$$i_{vh} = K_h\{I_{hdc} - I_{hac}\cos(2\theta_r + 2/3\pi)\}$$

$$i_{wh} = K_h\{I_{hdc} - I_{hac}\cos(2\theta_r - 2/3\pi)\} \quad (8)$$

The DC component extractor 402B calculates a DC component $K_h \cdot I_{hdc}$ of the high-frequency current amplitudes by calculating the average of the phase amplitudes of the high-frequency currents in the same manner as the DC component extractor 402. The position estimate calculator 403B stores in advance the relationship between the DC component $K_h \cdot I_{hdc}$ of the high-frequency current amplitudes and the rotor position, and calculates the position estimate 9, using this relationship and the DC component $K_h \cdot I_{hdc}$ of the high-frequency current amplitudes.

As described above, in the third embodiment, as compared with the first and second embodiments in which pulse-like voltages are sequentially applied to each of the phases, position estimation voltages can be applied simultaneously and continuously to the phases for continuous position estimation. Therefore, the rotor position can be estimated with good response. In the exemplary configuration described in the third embodiment, multiphase AC voltages are superimposed in a three-phase coordinate system. Alternatively, the control device 100B according to the third embodiment may be configured to superimpose multiphase AC voltages on the voltage commands $v_\alpha$ and $v_\beta$ in a stationary two-phase coordinate system, and extract high-frequency currents from the rotating electrical machine currents $i_\alpha$ and $i_\beta$ in a stationary two-phase coordinate system for position estimation.

Fourth Embodiment

In the first, second, and third embodiments, position estimation requires that the relationship between the DC component of high-frequency current amplitudes and the rotor position be stored in advance. In the fourth embodiment, an exemplary configuration for reducing the amount of information that should be stored for position estimation will be described.

Figure 9:
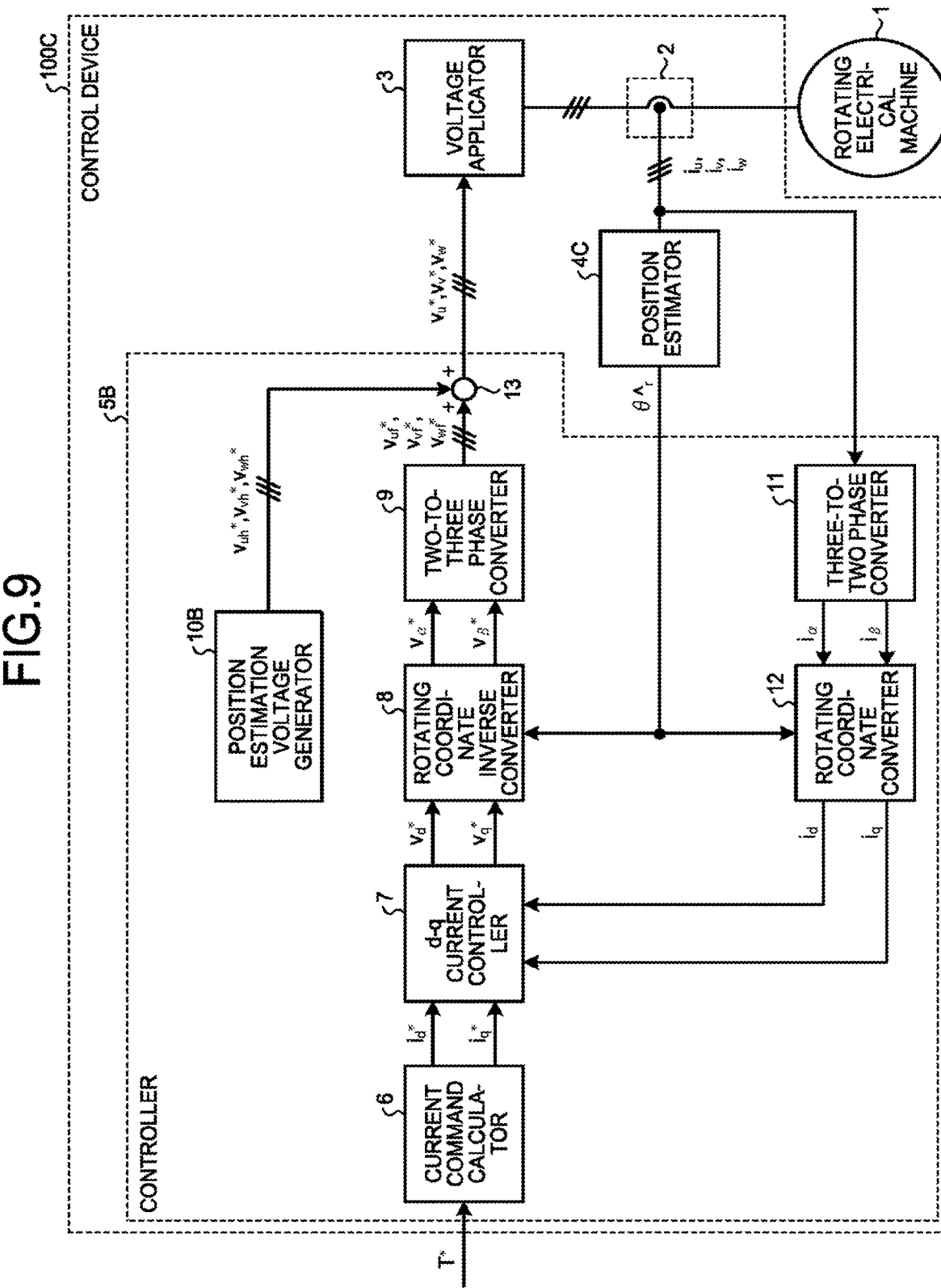
FIG. 9 is a diagram illustrating a configuration of a control device for a rotating electrical machine according to a fourth embodiment of the present invention.

FIG. 9 is a diagram illustrating a configuration of a control device for a rotating electrical machine according to the fourth embodiment of the present invention. The difference between the control device 100B according to the third embodiment and the control device 100C according to the fourth embodiment is that the control device 100C uses a position estimator 4C instead of the position estimator 4B.

Figure 10:
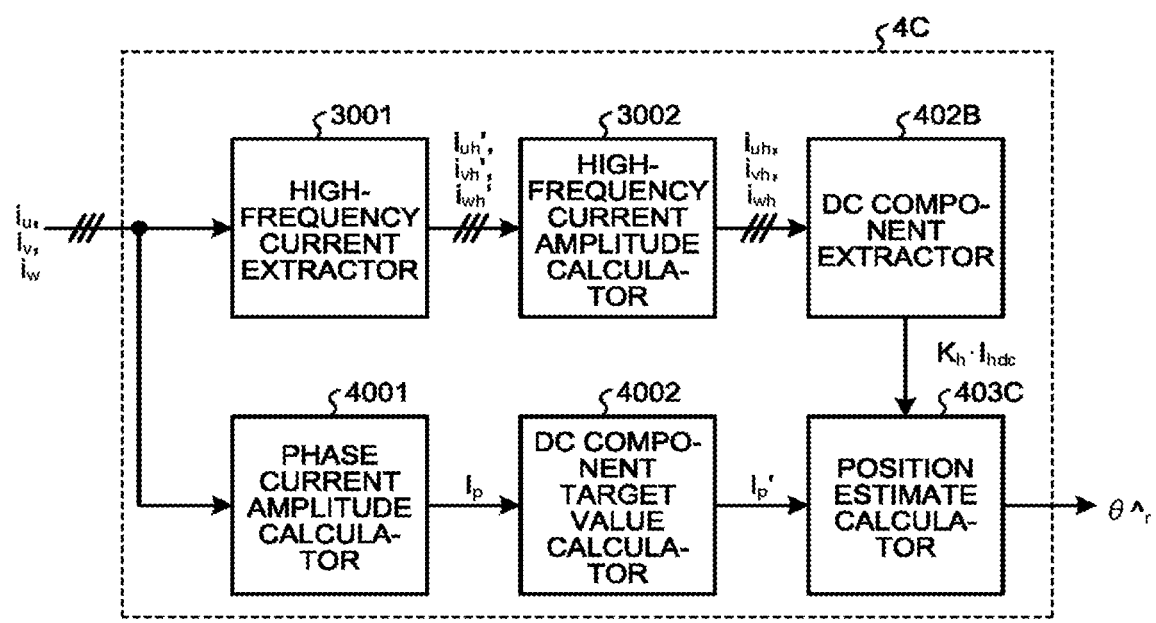
FIG. 10 is a diagram illustrating a configuration of a position estimator according to the fourth embodiment of the present invention.

FIG. 10 is a diagram illustrating a configuration of the position estimator according to the fourth embodiment. The difference between the position estimator 4B according to the third embodiment and the position estimator 4C according to the fourth embodiment is that the position estimator 4C includes a phase current amplitude calculator 4001 and a DC component target value calculator 4002 in addition to the high-frequency current extractor 3001, the high-frequency current amplitude calculator 3002, and the DC component extractor 402B and uses a position estimate calculator 403C instead of the position estimate calculator 403B.

The phase current amplitude calculator 4001 calculates a phase current amplitude $I_p$ of the rotating electrical machine 1 using Formula (9) below. The peak or absolute values of the rotating electrical machine currents $i_u$, $i_v$, and $i_w$ may be used for the method of calculating the phase current amplitude $I_p$. It goes without saying that a low-pass filter can be combined with the method of calculating the phase current amplitude $I_p$.

[Formula 9]

$$I_p = \sqrt{2/3}\sqrt{i_u^2 + i_v^2 + i_w^2} \quad (9)$$

As described in the first embodiment, when the energization angle of rotating electrical machine currents with respect to the rotor position is set in advance, the DC component of high-frequency current amplitudes with respect to the rotor position can be determined in a manner unique to the torque command value T*, namely the phase current amplitude, around the d-axis of the rotating electrical machine 1. Therefore, the DC component target value calculator 4002 stores in advance the relationship between the target value of the DC component and the phase current amplitude, and outputs a DC component target value $I_p'$ using this relationship. Note that this relationship is stored in association with the range of torques, i.e. rotating electrical machine currents, expected to be used. The position estimate calculator 403C performs integration control such that the DC component of the high-frequency current amplitudes has the DC component target value $I_p'$, and calculates the position estimate $\hat{\theta}_r$. Target value tracking control may be proportional integration control or proportional integration derivative control.

As described above, the position estimator 4C according to the fourth embodiment can reduce the amount of information that should be stored for position estimation, and can accurately execute position estimation during magnetic saturation while preventing an increase in calculation load.

Fifth Embodiment

In the first, second, third, and fourth embodiments, exemplary configurations for performing position estimation using the DC component of high-frequency current amplitudes have been described. However, when the degree of magnetic saturation of the rotating electrical machine 1 is small, a conventional position estimation method can be used. The fifth embodiment provides an exemplary configuration for switching, according to the degree of magnetic saturation, between the conventional position estimation method and the position estimation method that uses the DC component of high-frequency current amplitudes.

Figure 11:
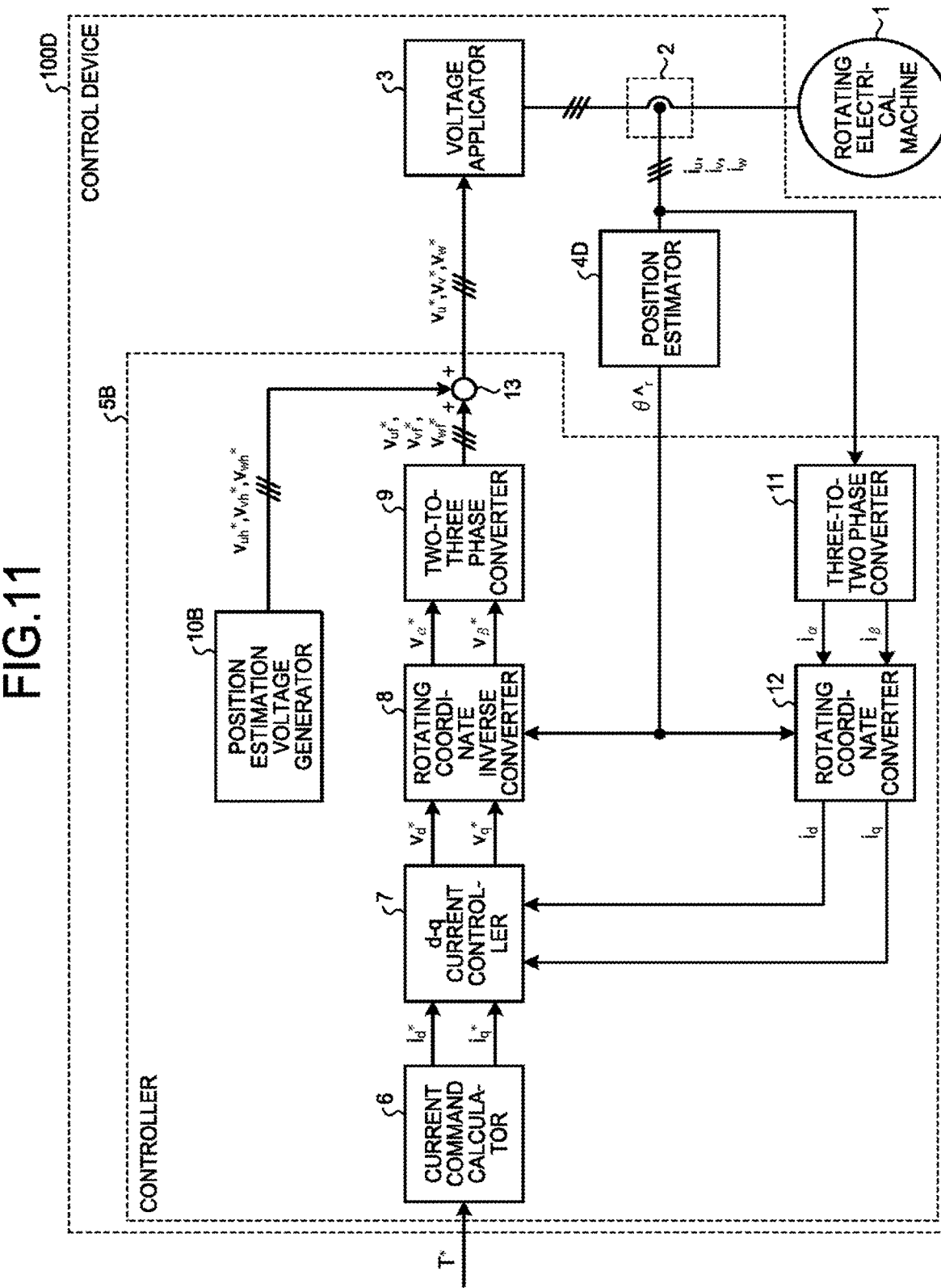
FIG. 11 is a diagram illustrating a configuration of a control device for a rotating electrical machine according to a fifth embodiment of the present invention.

FIG. 11 is a diagram illustrating a configuration of a control device for a rotating electrical machine according to the fifth embodiment of the present invention. The difference between the control device 100B according to the third embodiment and the control device 100D according to the fifth embodiment is that the control device 100D uses a position estimator 4D instead of the position estimator 4B.

Figure 12:
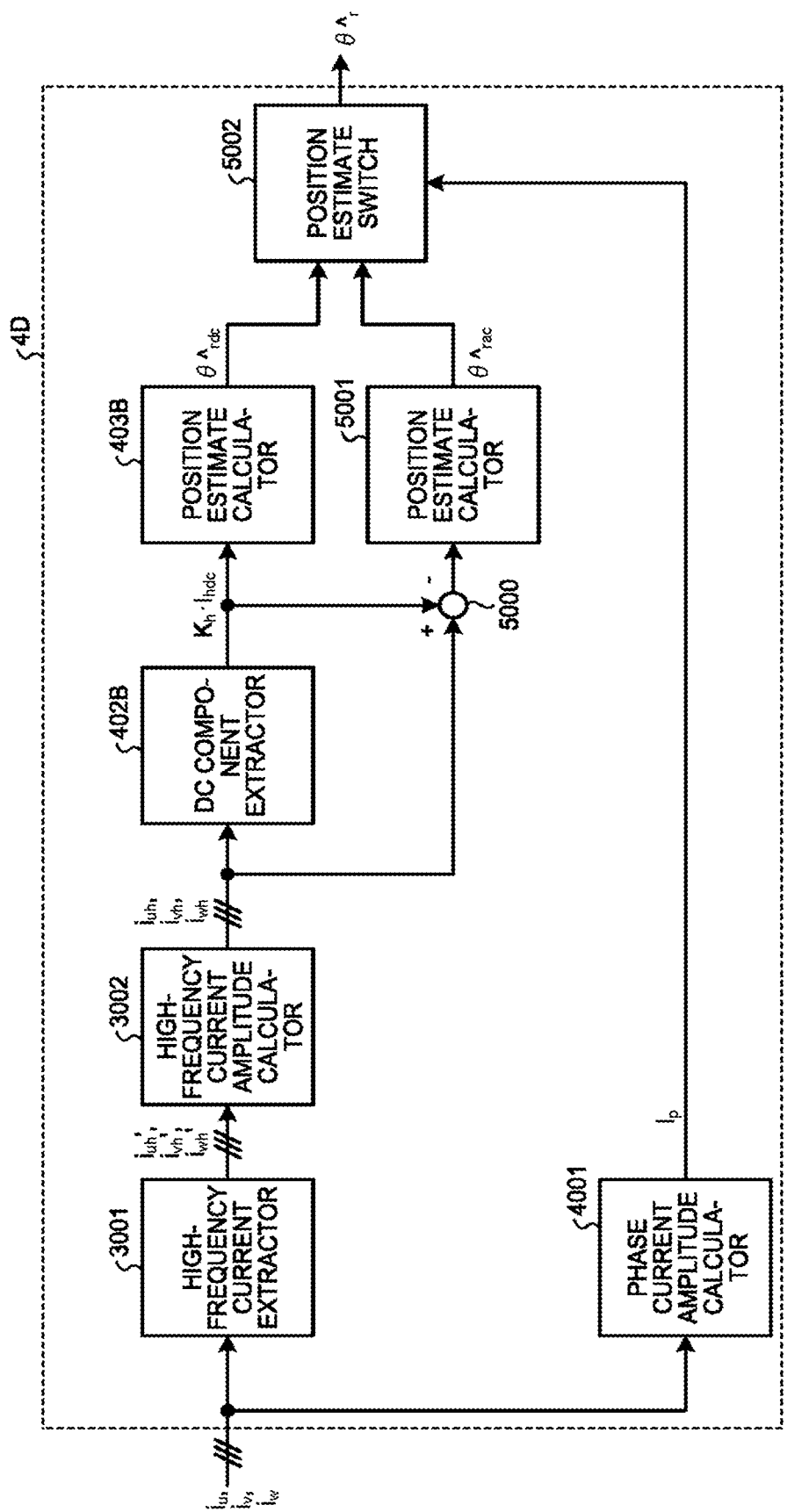
FIG. 12 is a diagram illustrating a configuration of a position estimator according to the fifth embodiment of the present invention.

FIG. 12 is a diagram illustrating a configuration of the position estimator according to the fifth embodiment of the present invention. The difference between the position estimator 4B according to the third embodiment and the position estimator 4D according to the fifth embodiment is that the position estimator 4D includes the phase current amplitude calculator 4001, a subtractor 5000, a position estimate calculator 5001, and a position estimate switch 5002 in addition to the high-frequency current extractor 3001, the high-frequency current amplitude calculator 3002, the DC component extractor 402B, and the position estimate calculator 403B.

The subtractor 5000 calculates the AC components of the high-frequency current amplitudes by subtracting the DC component $K_h \cdot I_{hdc}$ of the high-frequency current amplitudes from the amplitudes $i_{uh}$, $i_{vh}$, and $i_{wh}$ of the high-frequency currents. The AC components of the high-frequency current amplitudes calculated by the subtractor 5000 are input to the position estimate calculator 5001. The position estimate calculator 5001 then calculates a position estimate $\theta^{\wedge rac}$ using the conventional position estimation method described in the first embodiment. With the conventional position estimation method, although position estimation cannot be accurately performed in the case of magnetic saturation, position estimation can be performed without storing information on the rotor position in advance.

The position estimate switch 5002 selects a position estimate $\theta^{\wedge}_{rdc}$ calculated from the stored relationship between the DC component of high-frequency current amplitudes and the rotor position or the position estimate $\theta^{\wedge}_r$ estimated with the conventional position estimation method. The position estimate switch 5002 outputs the selected position estimate as the position estimate $\theta^{\wedge}_r$. The phase current amplitude $I_p$ is used for position estimate switching in the position estimate switch 5002.

When the value of the phase current amplitude $I_p$ is less than a threshold value set in the position estimate switch 5002, the position estimate switch 5002 determines that the degree of magnetic saturation is small. In this case, the position estimate switch 5002 selects the position estimate $\theta^{\wedge}_{rac}$ and outputs it as the position estimate $\theta^{\wedge}_r$. When the value of the phase current amplitude $I_p$ is equal to or greater than the threshold value set in the position estimate switch 5002, the position estimate switch 5002 determines that the degree of magnetic saturation is large. In this case, the position estimate switch 5002 selects the position estimate $\theta^{\wedge}_{rdc}$ and outputs it as the position estimate $\theta^{\wedge}_r$. A value at which the rotating electrical machine 1 is magnetically saturated is set as the threshold value. Therefore, in a case where the degree of magnetic saturation is small, it is not necessary to store information about the rotor position in advance. Thus, the amount of information that should be stored for position estimation can be reduced. In a case where the degree of magnetic saturation is large, the rotor position can be stably estimated by using the DC component of high-frequency current amplitudes. Instead of the phase current amplitude $I_p$, the torque command value T* or a signal for determining the degree of magnetic saturation can be used for position estimate switching.

As described above, when the degree of magnetic saturation is small, the position estimator 4D according to the fifth embodiment can perform position estimation by using the conventional position estimation method without the need to store information about the rotor position in advance. Therefore, the position estimator 4D according to the fifth embodiment can achieve the effect of eliminating the need to read the rotor position for position estimation calculations and thus accelerating position estimation calculations.

Figure 13:
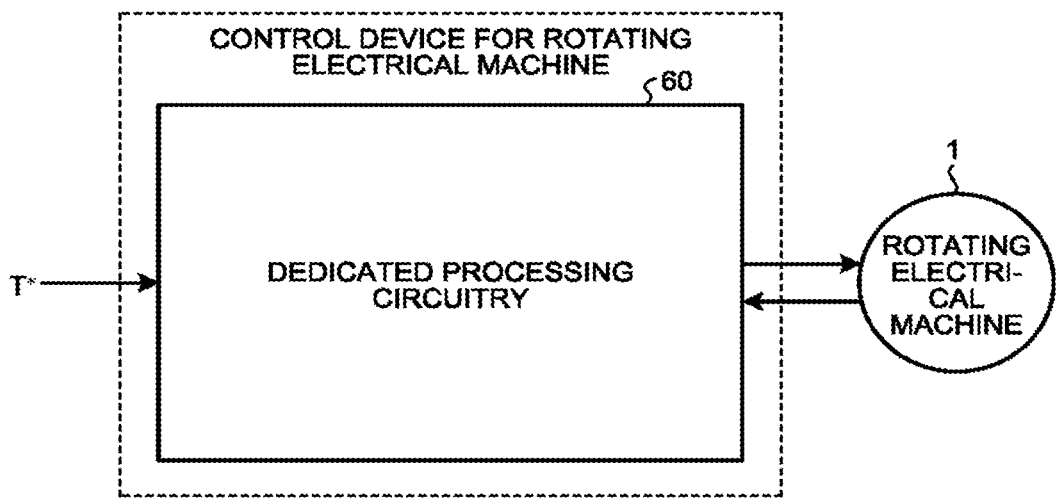
FIG. 13 is a diagram illustrating a first exemplary configuration of the hardware of the control device for a rotating electrical machine according to any of the first to fifth embodiments of the present invention.
Figure 14:
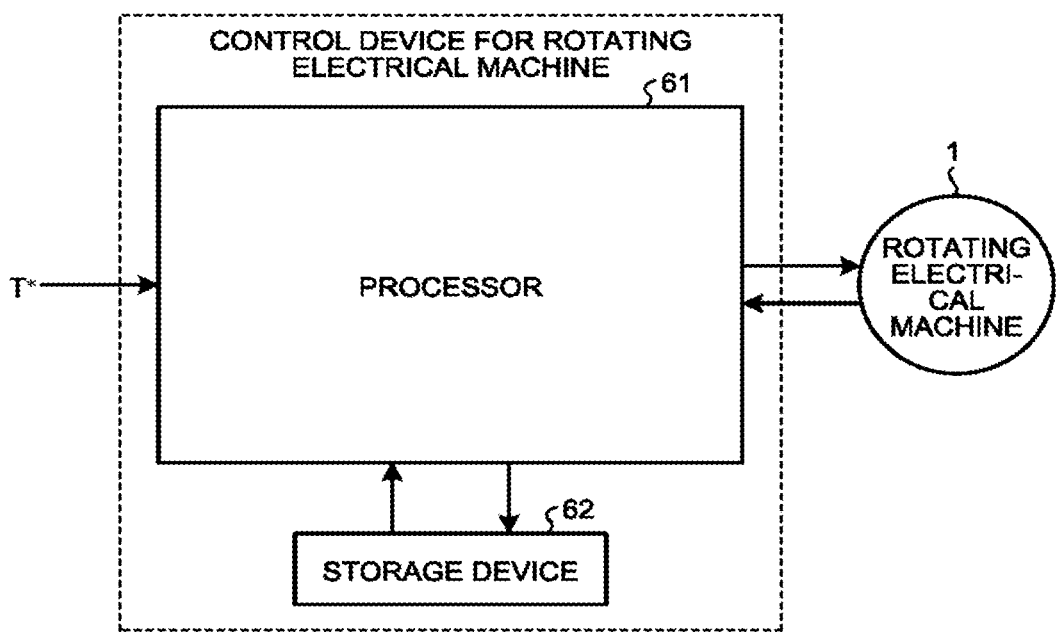
FIG. 14 is a diagram illustrating a second exemplary configuration of the hardware of the control device for a rotating electrical machine according to any of the first to fifth embodiments of the present invention.

Each of the functions of the control devices 100, 100A, 100B, 100C, and 100D according to the first to fifth embodiments can be implemented using processing circuitry. The functions are the current detector 2, the voltage applicator 3, the position estimators 4, 4B, 4C, and 4D, and the controllers 5, 5A, and 5B. FIG. 13 is a diagram illustrating a first exemplary configuration of the hardware of the control device for a rotating electrical machine according to any of the first to fifth embodiments of the present invention. FIG. 14 is a diagram illustrating a second exemplary configuration of the hardware of the control device for a rotating electrical machine according to any of the first to fifth embodiments of the present invention. FIG. 13 is an example in which the above processing circuitry is implemented by dedicated hardware such as dedicated processing circuitry 60. FIG. 14 is an example in which the above processing circuitry is implemented by a processor 61 and a storage device 62.

In a case where dedicated hardware is used as illustrated in FIG. 13, the dedicated processing circuitry 60 may be a single circuit, a composite circuit, a programmed processor, a parallel programmed processor, an ASIC, an FPGA, or a combination thereof. The functions described above may be implemented by separate processing circuits, or may be collectively implemented by a processing circuit.

In a case where the processor 61 and the storage device 62 are used as illustrated in FIG. 14, each of the functions described above is implemented by software, firmware, or a combination thereof. Software or firmware is described as programs and stored in the storage device 62. The processor 61 reads and executes the programs stored in the storage device 62. It can also be said that these programs cause a computer to execute the procedures and methods for each of the above functions. The storage device 62 may be a semiconductor memory such as a random access memory (RAM), a read only memory (ROM), a flash memory, an erasable programmable read only memory (EPROM), or an electrically erasable programmable read only memory (EEPROM, registered trademark). A semiconductor memory may be a nonvolatile memory or a volatile memory. Instead of a semiconductor memory, the storage device 62 may be a magnetic disk, a flexible disk, an optical disk, a compact disk, a mini disk, or a digital versatile disc (DVD).

Some of the above functions may be implemented by hardware, and the others may be implemented by software or firmware. As a specific example, the functions of the current detector 2 and the voltage applicator 3 are implemented using dedicated hardware, and the functions of the position estimators 4, 4B, 4C, and 4D and the controllers 5, 5A, and 5B are implemented using the processors 61 and the storage device 62.

The rotating electrical machine 1 described in the first, second, third, fourth, and fifth embodiments is a synchronous reluctance motor. However, the control devices 100, 100B, 100C, and 100D according to the first to fifth embodiments can be applied to the rotating electrical machine 1 as long as that is a motor having saliency such as an embedded magnet type synchronous motor.

In the first to fifth embodiments, the rotor position is estimated from the DC component of high-frequency current amplitudes. However, for the purpose of improving the accuracy of position estimation or reducing noise, position estimation voltage commands of variable magnitude can be used. In this case, it is obvious that the ratio of the DC component to the position estimation voltage commands, e.g. the DC component of the inductance, can be used instead of the DC component of the high-frequency current amplitudes.

In the first to fifth embodiments, the controllers 5, 5A, and 5B of the control devices 100, 100B, 100C, and 100D control the torque. Alternatively, the controllers 5, 5A, and 5B can be configured to control the rotational speed. In the first to fifth embodiments, current commands for the rotating electrical machine 1 with respect to the torque are selected such that the current effective value, that is, the copper loss, is minimized. Alternatively, the control devices 100, 100B, 100C, and 100D may be configured such that the interlinkage magnetic flux or the loss of the rotating electrical machine 1 is minimized. In the exemplary configurations described in the first to fifth embodiments, the current detector 2 detects the phase currents of the rotating electrical machine 1. However, the control devices 100, 100B, 100C, and 100D may be configured in any manner as long as these devices can detect phase currents. For example, a current sensor which is a voltage application unit incorporated in the inverter may detect the phase currents of the rotating electrical machine 1.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

1 rotating electrical machine; 2 current detector; 3 voltage applicator; 4, 4B, 4C, 4D position estimator; 5, 5A, 5B controller; 6, 21 current command calculator; 7 d-q current controller; 8 rotating coordinate inverse converter; 9 two-to-three phase converter; 10, 10B position estimation voltage generator; 11 three-to-two phase converter; 12 rotating coordinate converter; 13 adder; 22 three-phase current calculator; 23 three-phase current controller; 60 dedicated processing circuitry; 61 processor; 62 storage device; 100, 100A, 100B, 100C, 100D control device; 401, 3001 high-frequency current extractor; 402, 402B DC component extractor; 403, 403B, 403C, 5001 position estimate calculator; 3002 high-frequency current amplitude calculator; 4001 phase current amplitude calculator; 4002 DC component target value calculator; 5000 subtractor; 5002 position estimate switch.

The invention claimed is:

1. A control device for a rotating electrical machine; the control device comprising:
    processing circuitry
        to detect rotating electrical machine currents that are alternating currents flowing to the rotating electrical machine;
        to generate a position estimation voltage command for each phase of the rotating electrical machine;
        to extract position estimation currents included in the rotating electrical machine currents based on the position estimation voltage commands;
        to estimate a rotor position of the rotating electrical machine based on a DC component of amplitudes of the position estimation currents, the DC component being not changed according to the rotor position;
        to calculate drive voltage commands for driving the rotating electrical machine based on the rotating electrical machine currents and the estimated rotor position;
        to obtain rotating electrical machine voltage commands as a sum of the position estimation voltage commands and the calculated drive voltage commands,
        to output the rotating electrical machine voltage commands; and
    to apply a voltage to the rotating electrical machine based on the rotating electrical machine voltage commands, wherein the processing circuitry calculates the estimated rotor position on a basis of a relationship between: a rotor position of the rotating electrical machine that is represented by a difference from a d-axis of the rotating electrical machine as a reference position, and the DC component.

2. The control device for a rotating electrical machine according to claim 1, wherein the DC component is an average of the amplitudes of the phases of the position estimation currents.

3. The control device for a rotating electrical machine according to claim 1, wherein the position estimation voltage commands are pulse-like voltages and separately applied to each of the phases.

4. The control device for a rotating electrical machine according to claim 1, wherein the position estimation voltage commands are multiphase AC voltages.

5. The control device for a rotating electrical machine according to claim 4, wherein the processing circuitry calculates the amplitudes of the position estimation currents by integrating squares of the position estimation currents.

6. The control device for a rotating electrical machine according to claim 5, wherein an integration interval for the integrating is an integral multiple of a half period of the position estimation voltage commands.

7. The control device for a rotating electrical machine according to claim 1, wherein the processing circuitry stores in advance a relationship between the DC component and the rotor position, which is represented by a difference from a reference position that is a d-axis of the rotating electrical machine, and performs position estimation using the relationship.

8. The control device for a rotating electrical machine according to claim 1, wherein the processing circuitry performs position estimation by tracking control such that the DC component has a DC component target value stored in advance.

9. The control device for a rotating electrical machine according to claim 1, wherein the processing circuitry performs control such that the rotating electrical machine currents have a value at which the rotating electrical machine is magnetically saturated.

10. The control device for a rotating electrical machine according to claim 1, wherein when an amplitude of the rotating electrical machine currents is less than a threshold value set to the value at which the rotating electrical machine is magnetically saturated, the processing circuitry performs position estimation using an AC component of the amplitudes of the position estimation currents, the AC component being changed according to the rotor position, and when the rotating electrical machine currents are equal to or greater than the threshold value, the processing circuitry performs position estimation using the DC component of the amplitudes of the position estimation currents, the DC component being not changed according to the rotor position.

11. A method of operating a control device for a rotating electrical machine, the method comprising:
    detecting rotating electrical machine currents that are alternating currents flowing to the rotating electrical machine;
    generating a position estimation voltage command for each phase of the rotating electrical machine:
    extracting position estimation currents included in the rotating electrical machine currents based on the position estimation voltage commands;
    estimating a rotor position of the rotating electrical machine based on a DC component of amplitudes of the position estimation currents, the DC component being not changed according to the rotor position;
    calculating drive voltage commands for driving the rotating electrical machine based on the rotating electrical machine currents and the estimated rotor position;
    obtaining rotating electrical machine voltage commands as a sum of the position estimation voltage commands and the calculated drive voltage commands,
    outputting the rotating electrical machine voltage commands;
    applying a voltage to the rotating electrical machine based on the rotating electrical machine voltage commands, wherein
    the estimated rotor position is calculated on a basis of a relationship between: a rotor position of the rotating electrical machine that is represented by a difference from a d-axis of the rotating electrical machine as a reference position, and the DC component.

* * * * *